(12) United States Patent
Kuwada et al.

(10) Patent No.: US 6,233,396 B1
(45) Date of Patent: May 15, 2001

(54) LOAD CONTROL SYSTEM FOR MOTOR

(75) Inventors: Katsuzi Kuwada, Kariya; Shinichi Konda, Anjo, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/375,041

(22) Filed: Aug. 16, 1999

(30) Foreign Application Priority Data

Sep. 24, 1998 (JP) .................................................. 10-269965

(51) Int. Cl.[7] ....................................................... H02P 5/17
(52) U.S. Cl. .......................... 388/811; 318/254; 318/471; 701/36
(58) Field of Search ..................................... 318/254, 471; 361/23–34; 388/903, 934, 811; 701/36

(56) References Cited

U.S. PATENT DOCUMENTS

| | | | | |
|---|---|---|---|---|
| 5,019,757 | * | 5/1991 | Beifus | 318/254 |
| 5,148,092 | | 9/1992 | Ishii et al. | 318/696 |
| 5,418,676 | * | 5/1995 | Murakami et al. | 361/23 |
| 5,469,032 | * | 11/1995 | Otake | 318/439 |
| 5,780,983 | * | 7/1998 | Shinkawa et al. | 318/254 |
| 5,915,070 | * | 6/1999 | Takekawa et al. | 388/811 |

* cited by examiner

Primary Examiner—Robert E. Nappi
Assistant Examiner—Rita Leykin
(74) Attorney, Agent, or Firm—Harness, Dickey & Pierce, PLC

(57) ABSTRACT

A load control system includes a driving circuit for electrically controlling a blower motor, and a control circuit for generating a control signal for the motor. The driving circuit is directly connected to an electrical power source, and the control signal from the control circuit is input into the driving circuit through a signal input line. The control signal from the control circuit is a duty signal in which a duty ratio becomes 100% when the signal input line is ground short-circuited. In the load control system, a comparison circuit determines a ground short-circuited state of the signal input line when the duty ratio is increased to a value proximate to 100%, and the motor is automatically stopped based on output from the comparison circuit when the signal input line is ground short-circuited. Thus, the load control system can prevent full-load operation of the motor due to the ground short-circuit of the signal input line, even the driving circuit is directly connected to the electrical power source.

5 Claims, 4 Drawing Sheets

LOAD CONTROL SYSTEM FOR MOTOR

CROSS-REFERENCE TO RELATED APPLICATION

This application is related to and claims priority from Japanese Patent Application No. Hei. 10-269965 filed on Sep. 24, 1998, the contents of which are hereby incorporated by reference.

BACKGROUND OF THE INVENTION

1. Field of the Invention

The present invention generally relates to a load control system for preventing an error operation of a driving unit when a signal input line of a driving circuit is short-circuited, more particularly relates to a load control system for a blower motor of a vehicle air conditioner.

2. Description of Related Art

In recent years, a motor without a commutator and a brush (hereinafter, referred to as "motor") is used as a blower motor of a vehicle air conditioner, and a rotation speed of the motor is controlled by performing a pulse-width modulation control (PWM control) relative to a driving signal of an inverter for controlling electrical power applied to an armature winding of the motor.

For example, in a vehicle air conditioner, an electrical relay 140 which is turned on when an ignition switch 114 of a vehicle engine turns on is disposed between a vehicle battery 113 and a motor driving circuit (MDC) 117 of a blower motor 110, as shown in FIG. 6. That is, electrical power is supplied from the vehicle battery 113 to the motor driving circuit 117 through the electrical relay 140.

Further, as shown in FIG. 6, an armature winding 111 of the blower motor 110 is delta-connected, and an air-conditioning control unit (A/C ECU) 115 is connected between the ignition switch 114 and the motor driving circuit 117. The air-conditioning control unit 115 calculates a target rotation speed of the blower motor 110 and outputs a duty signal Dt. The duty signal Dt output from the air-conditioning control unit 115 is input into the motor driving circuit 117 through a signal input line 116. In the conventional system, the rotation speed of the blower motor 110 is controlled by the motor driving circuit 117 to be increased in proportion to an increase of the duty signal percentage (ratio) Dt (%), as shown in FIG. 7. Therefore, when the motor driving circuit 117 of the blower motor 110 or the air-conditioning control unit 115 has a trouble and full-load operation of the blower motor 110 is performed, the ignition switch 114 is turned off by a passenger, so that the electrical relay 140 is turned off and operation of the blower motor 110 can be stopped.

However, when the electrical relay 140 is not provided for reducing cost, the motor driving circuit 117 is directly connected to the vehicle battery 113. In this case, when the signal input line 116 for inputting signal to the motor driving circuit 117 is short-circuited on a vehicle side (i.e., ground short-circuited), 100% of duty signal Dt is applied to the motor driving circuit 117. As a result, the full-load operation of the blower motor 110 is continued even when the ignition switch 114 is turned off in this case, and over-discharge of the vehicle battery 113 may be caused.

SUMMARY OF THE INVENTION

In view of the foregoing problems, it is an object of the present invention to provide a load control system for a driving unit, which can automatically prevent full-load operation of the driving unit due to short-circuit of a signal input line for inputting signal from a control circuit to a driving circuit, even when the driving circuit is directly connected to a power source.

According to the present invention, a load control system for a driving unit includes a driving circuit directly connected to an electrical power source to electrically control the driving unit, a control unit for generating a control signal for the driving unit, a signal input line through which the control signal from the control circuit is input to the driving circuit, and a determining unit for determining a short-circuited state of the signal input line. In the load control system, when the determining unit determines that the short-circuited state of the signal input line, the driving circuit stops operation of the driving unit based on an output signal from the determining unit. Thus, even when the signal input line is short-circuited when the driving circuit is directly connected to the power source, the determining unit determines the short-circuited state, and the driving unit is automatically stopped. As a result, over-discharging of the power source is prevented.

Preferably, the control signal from the control circuit is a duty signal in which a duty ratio becomes 100% when the signal input line is short-circuited, and the determining unit determines that the signal input line is short-circuited when the duty ratio is increased to a value proximate to 100%. Therefore, the short-circuited state of the signal input line is readily determined without using a special sensor, and the load control system protects the driving unit with a simple structure.

More preferably, the driving circuit controls the driving unit in such a manner that load applied to the driving unit is increased as the duty ratio of the duty signal increases, until the duty ratio is increased to a predetermined value lower than 100%, and the driving circuit stops operation of the driving unit when the duty ratio becomes more than the predetermined value. Therefore, both of operation control of the driving unit during a normal operation and an automatic stop of the driving unit at an abnormal operation can be accurately performed.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

Figure 1:
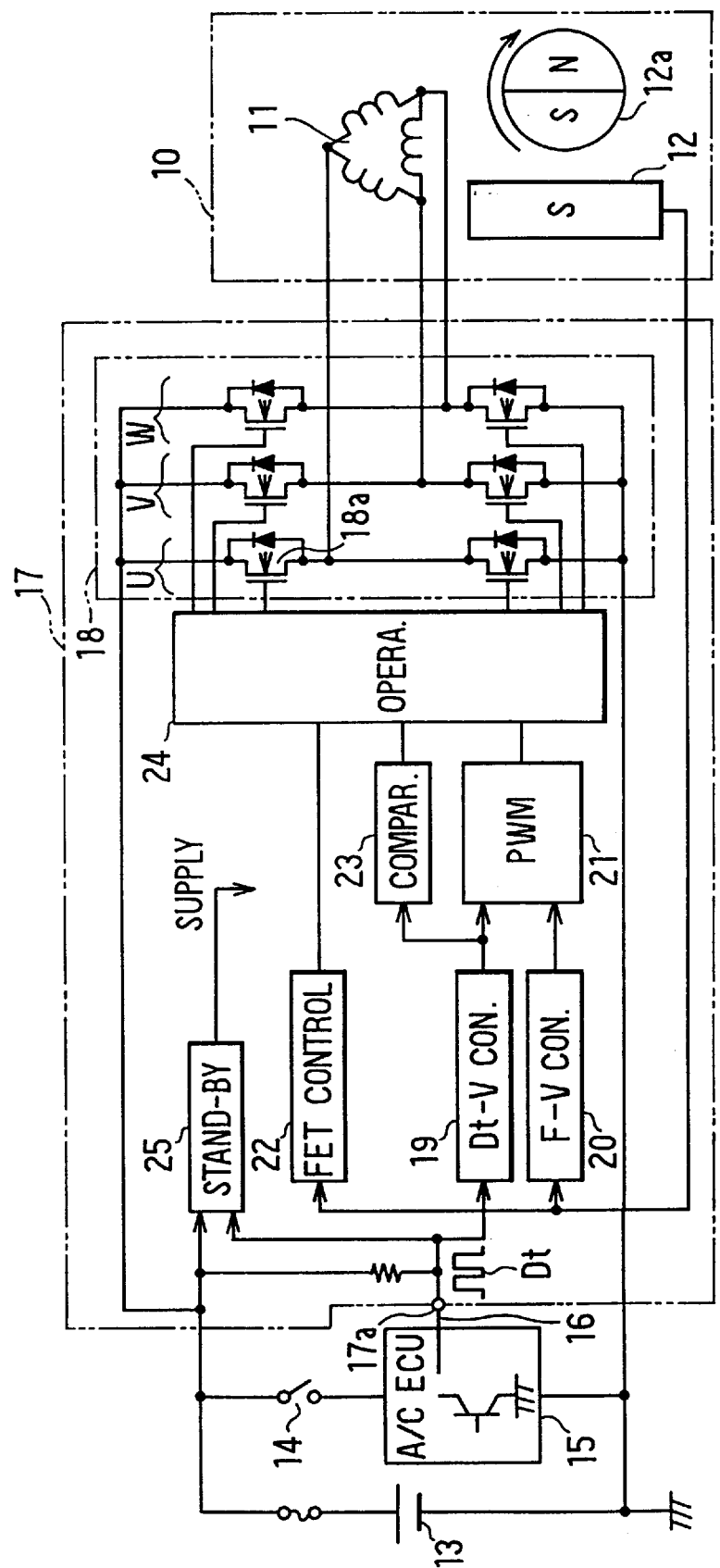
FIG. 1 is an electric wiring diagram showing a load control system according to a preferred embodiment of the present invention.
Figure 2:
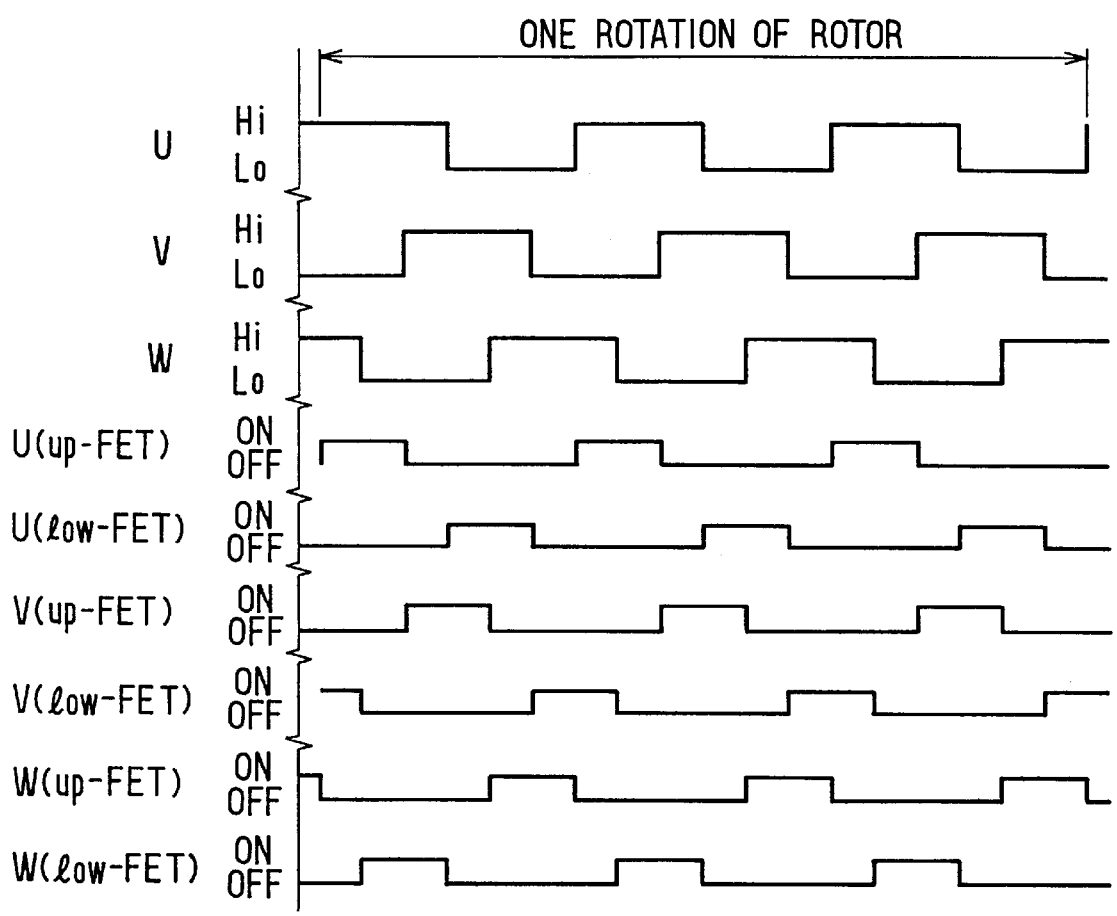
FIG. 2 is a timing chart with operation of a blower motor according to the embodiment.

A preferred embodiment of the present invention will be described hereinafter with reference to FIGS. 1–5. In the preferred embodiment, the present invention is applied to a control unit of a blower motor 10 for a vehicle air conditioner. The blower motor 10 is a motor without a commutator and a brush. As shown in FIG. 1, the blower motor 10 includes a delta-communication armature coil 11, a rotor (not shown) having a permanent magnetic for forming a rotating magnetic field, and a rotation position sensor 12 for detecting a rotation position of the rotor. For example, the rotation position sensor 12 is formed by a Hall element which detects a magnetic field change due to a rotation of a permanent magnet 12a connected to a rotation shaft of the rotor. In FIG. 1, only a single rotation position sensor 12 is indicated. However, actually, three rotation position sensors 12 are disposed around the single permanent magnet 12a in a rotation direction of the permanent magnet 12a to have the same distance between adjacent rotation position sensors 12. As shown in FIG. 2, outputs U, V, W of the three rotation position detectors 12 are wave forms having a predetermined position difference relative to the rotation position of the rotor.

A vehicle battery 13 is provided so that electrical power is supplied to an electronic control unit (A/C ECU) 15 of the vehicle air conditioner through an ignition switch 14 of a vehicle engine. The electronic control unit 15 calculates a target air temperature TAO of air blown into a passenger compartment of the vehicle based on a temperature of inside air inside the passenger compartment, a temperature of outside air outside the passenger compartment, a sunlight amount entering into the passenger compartment and a setting temperature of the passenger compartment. Further, the electronic control unit 15 calculates a target rotation speed of a blower based on the calculated target air temperature TAO. The calculated target rotation speed of the blower is output as a duty signal Dt from the electronic control unit 15, and is input into an input terminal 17a of a motor driving circuit 17 through a signal input line 16.

Figure 3:
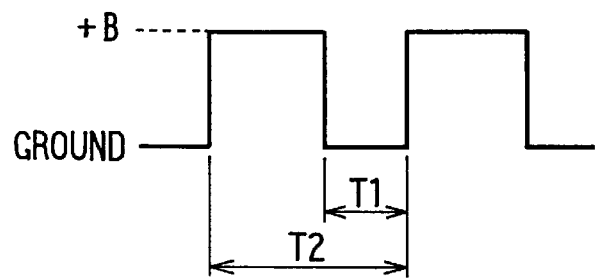
FIG. 3 is a wave form chart of a duty signal according to the embodiment.
Figure 4:
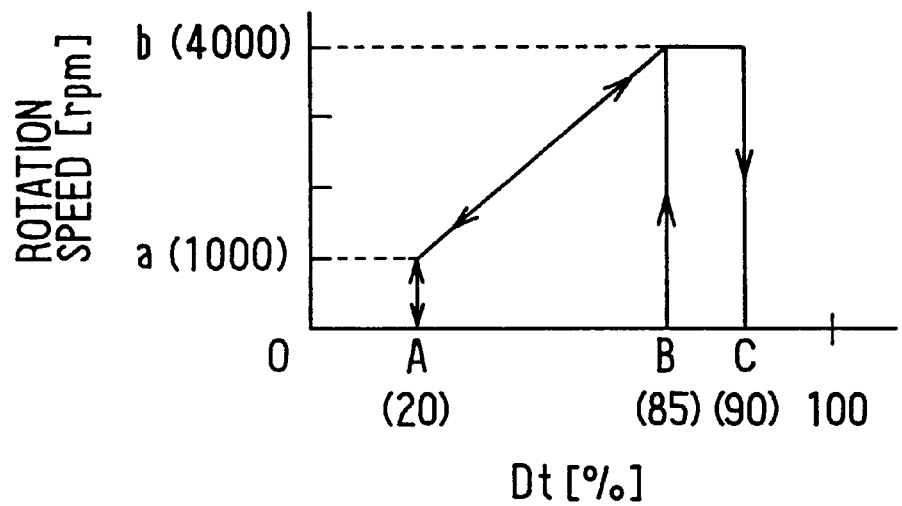
FIG. 4 is a graph of a motor output characteristic, showing the relationship between a rotation speed of the blower motor and a duty signal percentage Dt (%), according to the embodiment.

A duty signal percentage (duty signal ratio) Dt(%) is calculated based on a wave form of a duty signal shown in FIG. 3. That is, the duty signal percentage Dt(%)=(T1/T2)× 100%. The relationship between the duty signal percentage Dt(%) and a rotation speed of the blower motor 10 is shown in FIG. 4.

Next, a motor driving circuit 17 will be now described. An inverter 18 for controlling electrical power supplied to the armature coil 11 of the blower motor 18 forms a three-phase full-wave bridge circuit by using six field-effect transistors (FET) 18a as switching elements. The duty signal Dt from the signal input line 16 is converted to an analog voltage in a duty-voltage conversion circuit 19, and an analog voltage corresponding to the target rotation speed of the blower motor 10 is output from the duty-voltage conversion circuit 19.

On the other hand, a frequency of output of the rotation position sensor 12 is converted to an analog voltage in a frequency-voltage conversion circuit 20, and an analog voltage corresponding to an actual rotation speed of the blower motor 10 is output from the frequency-voltage conversion circuit 20. Next, a pulse-width modulating control is performed in a pulse-width modulating circuit 21 based on outputs from both conversion circuits 19, 20 so that the actual rotation speed of the blower motor 10 becomes equal to the target rotation speed, and an output pulse width is determined in the pulse-width modulating circuit 21. Driving control signals for controlling the six field-effect transistors (FET) 18a of the inverter are output from a FET driving control circuit 22, and the driving control signals are determined based on a rotor rotation position detected by the rotation position sensor 12 so that electrical control of the six field-effect transistors 18a is performed.

In the timing diagram of FIG. 2, U(up-FET), U(low-FET), V(up-FET), V(low-FET), W(up-FET), W(low-FET) indicate driving control signals from the FET driving control circuit 22 for controlling the six field-effect transistors 18a. Here, U, V, W correspond to outputs U, V, W of the rotation position sensor 12, and correspond to combinations U, V, W combining each pair of up and low field-effect transistors 18a of the inverter 18.

A comparison circuit 23 (determining unit) determines whether or not output voltage from the duty-voltage conversion circuit 19 reaches to a predetermined level. Each field-effect transistor 18a is operated by an operation circuit 24 based on the theoretical product of the output from the pulse-width modulating circuit 21, the output from the FET driving control circuit 22 and the output from the comparison circuit 23. In FIG. 1, only a single output line of the FET driving control circuit 22 is indicated relative to the operation circuit 24. However, actually, six output lines corresponding to the six field-effect transistors 18a are provided in the FET driving control circuit 22.

Electrical power supplied to each circuit 19–24 is controlled in a stand-by circuit 25 based on a duty signal Dt from the signal input line 16. That is, according to the duty signal Dt from the signal input line 16, electrical power is supplied to each circuit 19–24 when the blower motor 10 operates, and the supply of electrical power to each circuit 19–24 is stopped when operation of the blower motor 10 is stopped. Therefore, even when the motor driving circuit 17 is directly connected to the vehicle battery 13 without an electrical relay, electrical power consumption of each circuit 19–24 can be reduced.

Next, operation of the load control system according to the embodiment will be now described. Firstly, a normal operation will be now described. That is, in the normal operation, the signal input line 16 from the electronic control unit 15 to the motor driving circuit 17 does not have a trouble and is accurately connected to the input terminal 17a of the motor driving circuit 17. During the normal operation, when the ignition switch 14 of the vehicle engine is turned on, electrical power is supplied to the electronic control unit 15 of the vehicle air conditioner so that the electronic control unit 15 is operated. With operation of the vehicle air conditioner, the electronic control unit 15 calculates the target rotation speed of the blower motor 10 based on a calculated target air temperature (TAO). The calculated target rotation speed of the blower motor 10 is changed to the duty signal Dt shown in FIG. 3, and the duty signal Dt is input to the input terminal 17a of the motor driving circuit 17 through the signal input line 16.

In the motor driving circuit 17, the duty signal Dt is converted to an analog signal by the duty-voltage conversion circuit 19, and the F-V conversion circuit 20 outputs an analog signal corresponding to an actual motor rotation speed. Based on the output signals from both conversion circuits 18, 19, a pulse width signal is output from the pulse-width modulating circuit 21 to the operation circuit 24. The theoretical product of the output pulse width from the pulse-width modulating circuit 21 and the output control signal from the FET driving control circuit 22 is calculated in the operation circuit 24, and each power-supplying time of the field-effect transistors 18a of the inverter 18 is controlled by an operation circuit 24, thereby controlling the rotation speed of the blower motor 10.

In the embodiment of the present invention, as shown in FIG. 4, until the duty signal percentage Dt(%) is increased to a first predetermined value A (e.g., 20%) from zero, the operation of the blower motor 10 is stopped. After the duty signal percentage Dt(%) is increased to the first predetermined value A, the blower motor 10 is operated with a first predetermined rotation speed "a" (e.g., 1000 rpm). Thereafter, when the duty signal percentage Dt(%) is increased to be larger the first predetermined value A, the rotation speed of the blower motor 10 is increased in proportion to an increase of the duty signal percentage Dt(%). When the duty signal percentage Dt(%) is increased to a second predetermined value B (e.g., 85%) lower than 100% and proximate to 100%, the rotation speed of the blower motor 10 is increased to a full-load rotation speed "b" (e.g., 4000 rpm), and the blower motor is operated in a full-load operation state. The full-load operation state of the blower motor 10 is continued when the duty signal percentage Dt(%) is in a range between the second predetermined value B and a third predetermined value C (e.g., 90%) slightly larger than the second predetermined value B.

Until the duty signal percentage Dt(%) is increased to the third predetermined value C (e.g., 90%), it is determined that the signal input line 16 is in normal, and no signal is output from the comparison circuit 23. When the duty signal percentage Dt(%) is larger than the third predetermined value C (e.g., 90%), it is determined that the signal input line 16 has a trouble such as a ground short-circuit based on an increase of the output voltage from duty-voltage conversion circuit 19, and a signal is output from the comparison circuit 23. According to the output signal from the comparison circuit 23, all of the field-effect transistors 18a of the inverter 18 are compulsorily turned off, and the operation of the blower motor 10 is stopped. In this case, the motor driving circuit 17 is directly connected to the vehicle battery 13. Therefore, when the signal input line 16 toward the motor driving circuit 17 is ground short-circuited, the duty signal ratio of 100% may be applied to the motor driving circuit 17. However, according to the embodiment of the present invention, the comparison circuit 23 determines that the duty signal percentage Dy(%) is larger than the third predetermined value C (e.g., 90%), and the operation of the blower motor 10 can be automatically stopped. As a result, it can prevent the blower motor 10 from performing the full-load operation state in a long time due to the ground short-circuit of the signal input line 16, thereby preventing over-discharging of the vehicle battery 13.

Figure 5:
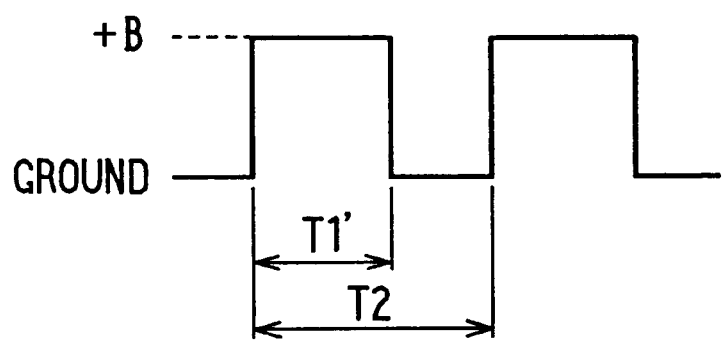
FIG. 5 is a wave form chart of a duty signal of a comparison example.
Figure 6:
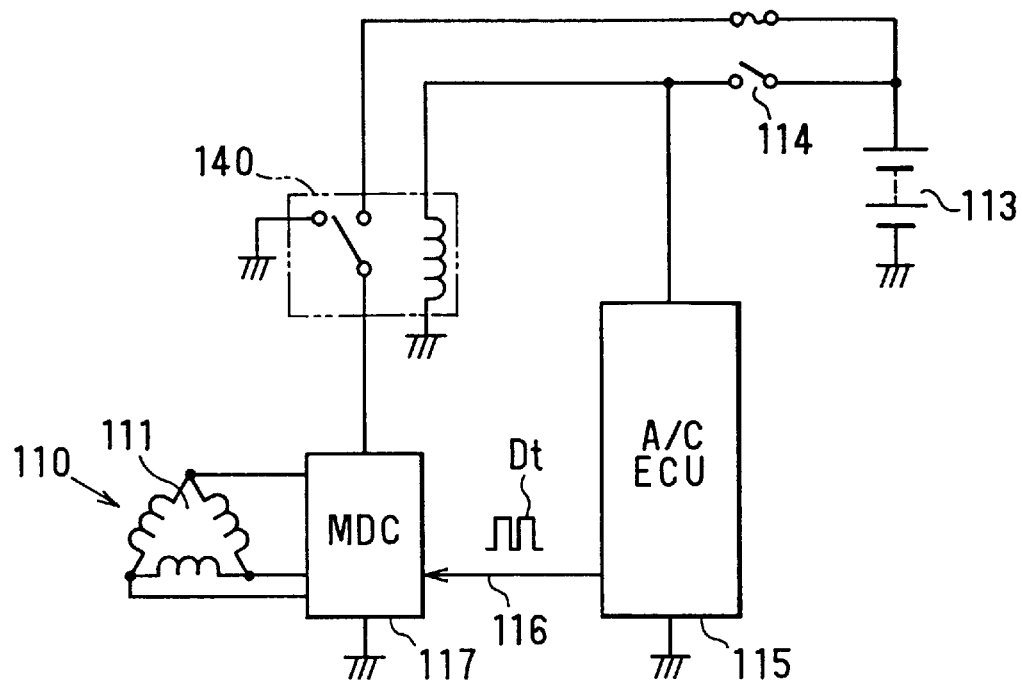
FIG. 6 is an electric wiring diagram showing a conventional load control system.
Figure 7:
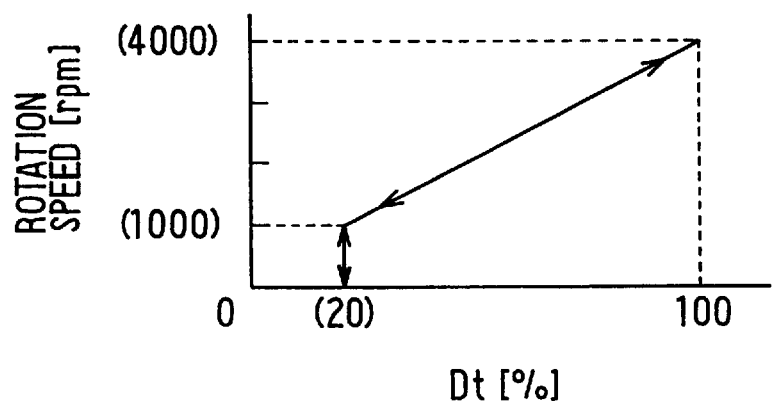
FIG. 7 is a graph of a conventional motor output characteristic.

In the above-described embodiment, as shown in FIG. 3, the duty signal percentage D(%) is calculated from a time T1 of a low level (e.g., ground voltage). As shown in FIG. 5, in a case where the duty signal percentage D(%) is calculated from a time T1' of a high level (e.g., +B position battery voltage) by using T1'/T2×100(%), when the signal input line 16 becomes in an opened state, the duty signal percentage Dt(%) applied to the input terminal 17a of the motor driving circuit 17 becomes 100%, and the blower motor 10 is operated with the full-load operation. However, the opened state of the signal input line 16 is generally readily caused as compared with the ground short-circuited state. Therefore, actually, the duty signal percentage Dt(%) calculated from FIG. 3 is more preferable than that from FIG. 5.

Although the present invention has been fully described in connection with the preferred embodiment thereof with reference to the accompanying drawings, it is to be noted that various changes and modifications will become apparent to those skilled in the art.

For example, in the above-described embodiment, the structure and the operation of the motor driving circuit 17 are explained from the block diagram of FIG. 1. However, the function of the motor driving circuit 17 is obtained by digital control of a micro-computer. Further, in the above-described embodiment, the present invention is applied to the blower motor without providing a commutator and a brush. However, the present invention may be applied to the other type motor, or the other electrical load except for the motor.

Such changes and modifications are to be understood as being within the scope of the present invention as defined by the appended claims.

What is claimed is:

1. A load control system for a driving unit, comprising:

a driving circuit for electrically controlling said driving unit, said driving circuit being directly connected to an electrical power source;

a control circuit for generating a control signal for said driving unit;

a signal input line through which the control signal from said control circuit is input to said driving circuit; and a determining unit for determining a short-circuited state of said signal input line, wherein:

said driving circuit stops operation of said driving unit based on an output signal from said determining unit when the determining unit determines that a short-circuited state of the signal input line exists;

the control signal from said control circuit is a duty signal in which a duty ratio becomes 100% when said signal input line is short-circuited;

said determining unit determines the short-circuited state of the signal input line when the duty ratio is increased to a value proximate to 100%;

said driving circuit controls said driving unit in such a manner that load applied to said driving unit is increased as the duty ratio of the duty signal of said control circuit increase, until the duty ratio is increased to a predetermined value lower than 100%;

said driving circuit stops operation of said driving unit when the duty ratio becomes more than the predetermined value; and said determining unit determines the short-circuited state of the signal input line when the duty ratio becomes more than the predetermined value.

2. The load control system according to claim 1, wherein:

said driving unit performs full-load operation when said signal input line is short-circuited; and the full-load operation is stopped by said driving unit when said determining unit determines the short-circuited state of said signal input line.

3. The load control system according to claim 1, wherein the short-circuited state is a ground-side shorted state.

4. A driving-unit control apparatus comprising:

a driving unit driven electrically;

a driving circuit for electrically controlling said driving unit, said driving circuit being directly connected to an electrical power source;

a control circuit for generating a control signal for said driving unit;

a signal input line through which the control signal from said control circuit is input to said driving circuit; and a determining unit for determining a short-circuited state of said signal input line, wherein:

said driving unit performs full-load operation when said signal input line is ground short-circuited;

said driving circuit stops the full-load operation of said driving unit when said determining unit determines the short-circuited state of said signal input line;

the control signal from said control circuit is a duty signal in which a duty ratio becomes 100% when said signal input line is ground short-circuited;

said determining unit determines the short-circuited state of the signal input line when the duty ratio is increased to a value proximate to 100%;

said driving unit is a motor having a rotor made from a permanent magnet and a delta-connection armature core;

said driving circuit controls operation of said motor by controlling an electrical power supplying to said armature coil of said motor;

said driving circuit controls said motor in such a manner that a rotation speed of said motor is increased as the duty ratio of the duty signal of said control circuit increase, until the duty ratio is increased to a predetermined value lower than 100%; and said driving circuit stops operation of said motor when the duty ratio becomes more than the predetermined value.

5. The driving-unit control apparatus according to claim 7, wherein:

said motor is for operating a blower;

said control circuit calculates a target rotation speed of said motor; and said control circuit generates the duty signal in such a manner that the duty ratio of the duty signal is increased in accordance with an increase of the target rotation speed.

* * * * *